United States Patent [19]
von Hertzen

[11] Patent Number: 5,410,220
[45] Date of Patent: Apr. 25, 1995

[54] CONTROL CIRCUIT FOR DRIVE CIRCUIT OF AN ELECTRONIC BALLAST FOR A DISCHARGE LAMP

[75] Inventor: Kari von Hertzen, Helsinki, Finland

[73] Assignee: Oy Helvar, Finland

[21] Appl. No.: 122,770

[22] Filed: Sep. 16, 1993

[30] Foreign Application Priority Data

Sep. 18, 1992 [FI] Finland .................................. 924185

[51] Int. Cl.$^6$ ............................................ H05B 37/02
[52] U.S. Cl. ................................ 315/209 R; 315/291;
315/307; 315/362; 315/216; 315/144;
315/DIG. 5; 315/DIG. 7
[58] Field of Search ................... 315/291, 209 R, 307,
315/DIG. 5, 362, DIG. 7, 216, 194

[56] References Cited

U.S. PATENT DOCUMENTS

| | | | |
|---|---|---|---|
| 4,237,403 | 12/1980 | Davis | 315/98 |
| 4,277,728 | 7/1981 | Stevens | 315/307 |
| 4,370,600 | 1/1983 | Zansky | 315/244 |
| 4,553,070 | 11/1985 | Sairanen | 315/209 R |

Primary Examiner—Robert J. Pascal
Assistant Examiner—Reginald A. Ratliff
Attorney, Agent, or Firm—Zarley, McKee, Thomte, Voorhees & Sease

[57] ABSTRACT

The invention relates to an electronic ballast for a discharge lamp, comprising a drive circuit supplying high-frequency current to the lamp and including two power switches (V1, V2) and control circuits therefor for controlling the power switches, such that the parallel half-waves of the lamp current pass through a first power switch (V1) and the reverse half-waves through a second power switch. Each power switch (V1; V2) is provided with its own, independently operating control circuit and each control circuit is provided with means (R1, R3, R8, R7) for sensing a current passing through and a voltage prevailing across the appropriate power switch (V1; V2) as well as with means (V3; V4) for controllably bringing the appropriate power switch (V1; V2) to a conducting state as a certain voltage prevails thereacross and to a non-conducting state as soon as a current passing therethrough reaches a certain threshold value (Ik; Ikl).

10 Claims, 1 Drawing Sheet

CONTROL CIRCUIT FOR DRIVE CIRCUIT OF AN ELECTRONIC BALLAST FOR A DISCHARGE LAMP

BACKGROUND OF THE INVENTION

1. Field of the Invention

The present invention relates to an electronic ballast for a discharge lamp, comprising a drive circuit supplying high-frequency current to the lamp and including two power switches and control circuits therefor for controlling the power switches, such that the parallel half-waves of the lamp current pass through a first power switch and the reverse half-waves through a second power switch.

2. Problems in the Art

This type of drive circuits connected as a half-bridge are conventional in electronic ballasts for discharge lamps. As one example, reference can be made to the Applicant's U.S. Pat. No. 4,553,070. As prior art, reference can also be made to Patent publications U.S. Pat. No. 4,237,403, U.S. Pat. No. 4,277,728 and U.S. Pat. No. 4,370,600. A common feature to all these prior art circuit designs is that the control of power switches is based on information about the operation of the accompanying switch. This information is typically received from a transformer fitted in the lamp circuit. However, this involves a drawback of having to use a high-voltage differential in a control circuit, which is relative expensive to carry out whether using semiconductor technology or a transformer.

SUMMARY OF THE INVENTION

An object of the invention is to provide an improved ballast, wherein the control of power switches is effected such that no information is required about the operation of the accompanying switch and, thus, it is not necessary to use a high-voltage differential in a control circuit.

This object of the invention is achieved on the basis of the characterizing features set forth in the annexed claim 1.

The other claims disclose preferred embodiments for the invention.

DESCRIPTION OF THE PREFERRED EMBODIMENT

Figure 1:
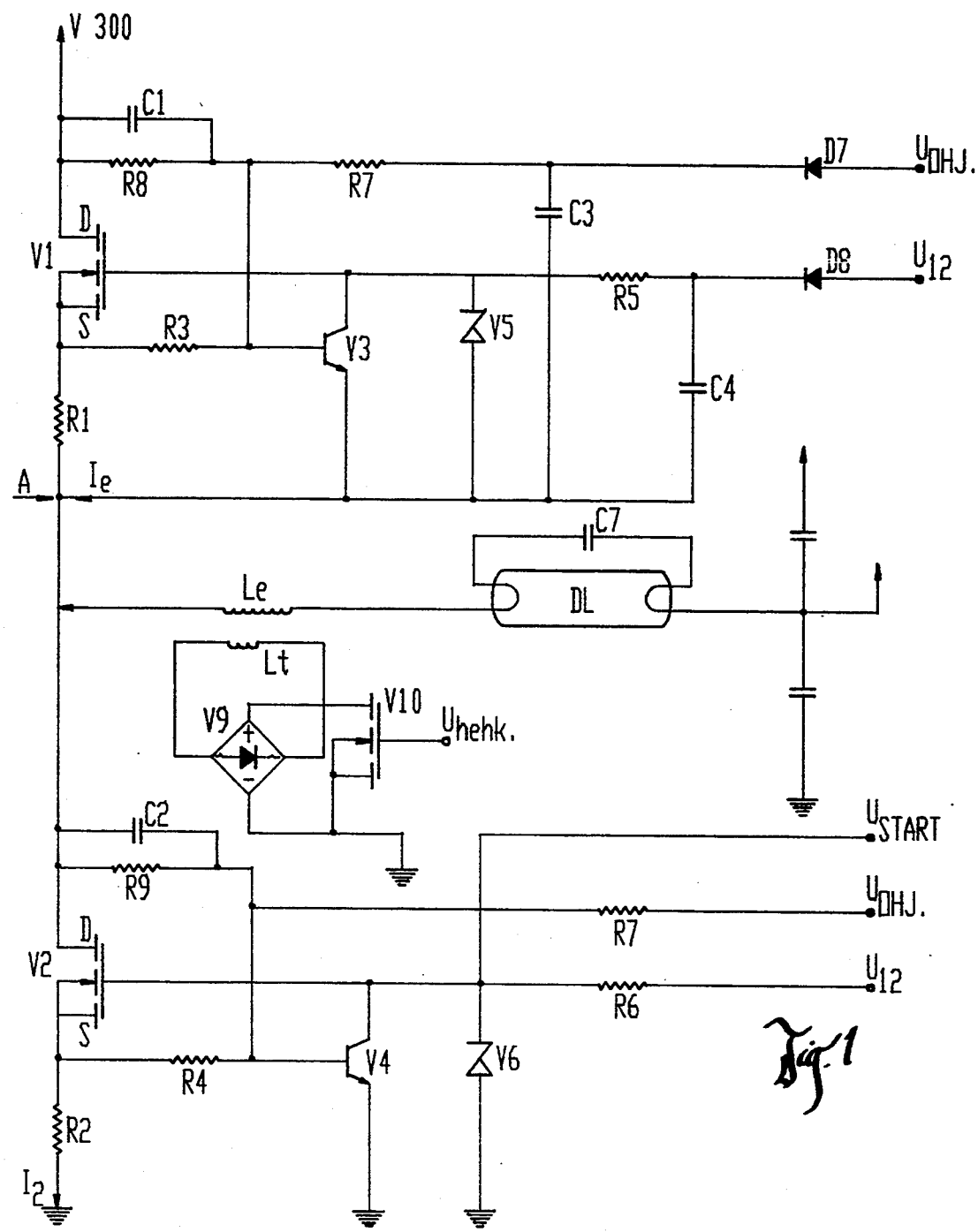
FIG. 1 is an electrical schematic of a preferred embodiment of the invention.
Figure 2:
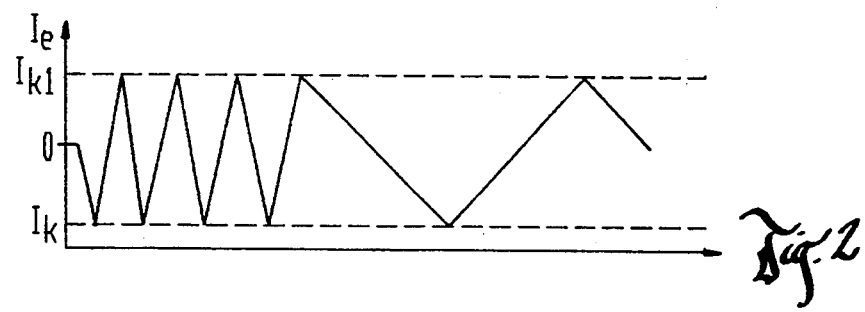
FIG. 2 is a graphic representation of current during operation of the circuit of FIG. 1.

The invention will now be described in more detail with reference made to the accompanying drawings, illustrating a circuit diagram (FIG. 1) for a drive circuit according to one embodiment of the invention and a graph (FIG. 2) illustrating $I_e$, as further explained below.

The setup and operation of a drive circuit are as follows:

Two power switches V1 and V2 are connected in series between an operating voltage V300 and earth GND. A lamp DL is connected by way of an inductance Le to a point A between switches V1 and V2.

The drive circuit actuates upon receiving a suitable pulse on a pin Ustart, e.g. by means of a typical diac-circuit. The pulse raises a pin G of V2 over a barrier voltage, whereby V2 is conducting and the voltage of point A drops near the ground level. Thus, C3 and C4 are charged by way of D7 and D8 approximately to voltages Uohj. and U12.

Across V1 there is a voltage U300. Via R8 progresses a base current to V3, which is conducting and maintains a low grid voltage in V1, although current flows from C4 through a limit resistance R5. V1 remains in congestion.

Across Le there is a voltage U150 and, thus, a rising current Ie begins to pass therethrough. The mode of current is determined by Le, C7 and DL. I2 is roughly the same as Ie. At a certain threshold value, a transistor V4 is conducting and pulls down the grid voltage of V2. This increases the anode voltage, whereby V4 receives more base current by way of C2. This positive feedback results in a quick switch-off of the current of V2.

A current threshold value Ik depends not only on the barrier voltage of V4 but also on resistances R4, R7 and R9 as well as on voltage Uohj. Ik can be fluctuated by varying Uohj.

When V1 switches off, Ie is no longer capable of reaching the ground. Thus, the voltage of point A rises until the internal diode of V1 is conducting and Ie proceeds to the operating voltage. Across V2 there is roughly a voltage U300. Thus, V4 receives base current by way of R9 and maintains a low grid voltage Ugs in V2.

The voltage across V1 is low and V3 does not receive a sufficient base current by way of R8. Thus, the grid voltage of V1 rises to a voltage determined by C4 and V1 is conducting also by way of its channel.

Ie proceeds towards the operating voltage but across Le there is a reverse voltage. Thus, Ie diminishes to zero and begins to increase in reverse direction until, at a certain threshold value Ikl, transistor V3 receives base current by means of R1 and R3 and pulls down the grid voltage of V1. The anode voltage of V1 rises and V3 receives more control current by way of C1. V1 switches off quickly.

Ikl is determined by R1, R3, R8 and R9 as well as Uc3. The components are dimensioned such that in a normal situation Ik=Ikl.

After V1 has switched off, the voltage of point A decreases until Ie is capable of continuing by way of the internal diode of V2. V4 no longer receives a control through R9 and, hence, the grid of V2 rises to a voltage U12.

Ie falls to zero and begins to rise the same way as at the start. The circuit oscillates.

The drive circuit switching is a half-H-bridge with a conventional general principle. However, the control of power switches V1 and V2 is effected such that no information is required about the operation of the accompanying switch. Sufficient for controlling the switch is information about its own current and preferably also about a voltage prevailing across itself. Thus, there is no need to use a high-voltage differential in the control circuit, which would be an expensive solution whether carried out by means of silicon or a transformer.

Lt is a secondary winding of inductance Le and it can be short-circuited by means of V9 and V10 by conducting a suitable voltage to a pin Uhehk.

When lamp DL is glowed, Lt is in short-circuit. Thus, the inductance observed by current Ie is low and the rising speed is high. The drive circuit operates at a high frequency. The filament current of DL, which travels through C7, is sufficiently high and the lamp voltage is low. When the short-circuit is removed, Ie observes a high inductance and the operating frequency of a drive circuit drops. Across C7 develops a high voltage, which switches the lamp on.

When the lamp light is on, there is a light-on voltage across C7 which is much lower than the switch-on voltage. Hence, the current of C7 is low.

The circuit includes capacitors C5 and C6 for blocking the passage of direct current in the lamp circuit and for maintaining a cathode connected to the common point thereof at a desired potential, e.g. V150.

The power switches V1 and V2 preferably comprise MOSFET transistors, which have a reasonable price and low power losses as compared to several other components currently available for carrying out the corresponding action.

In a drive circuit as described above, the external controls Uohj. as well as voltage V12 can be the same for both control circuits or they can also be different from each other. Variations of control voltage Uohj. can be used for changing the incandescent power, switch-on voltage and light-on current of a lamp. However, in terms of the operation of control circuits R1, R3, R7, R8, V3 and R2, R4, R7, R9 and V4 the external control is only of secondary significance, since the operation of the circuits is primarily based on a current passing through the particular power switch V1 or V2 being controlled at a given time or on the measurement of parameters derived from such current. In addition to this primary and active control parameter, the switch-on or switch-off instant of power switches can be affected by external control. If external control Uohj. is not employed, the switch of condition of power switches is determined on the basis of a current passing thereby and on the dimensions of a control circuit. Thus, despite the external secondary control, the control circuits are functionally independent, i.e. there is no mutual data transmission link therebetween for determining the switch-on or switch-off instant of power switches.

I claim:

1. An electronic ballast for a discharge lamp, comprising a drive circuit supplying high-frequency current to the lamp and including two power switches (V1, V2) and control circuits therefor for controlling the power switches, such that the parallel half-waves of the lamp current pass through a first power switch (V1) and the reverse half-waves through a second power switch, characterized in that control circuits (R1, R3, R8, R7, V3/R2, R4, R9, R7, V4) are functionally independent, such that a switch of condition of power switches (V1/V2) is determined on the basis of a current passing through the very power switch (V1/V2) being controlled as well as on the basis of the dimensions of control circuits (R1, R3, R8, R7, V3/R2, R4, R9, R7, V4) and/or on the basis of an external control (Uohj.).

2. A ballast as set forth in claim 1, characterized in that said control circuits (R1, R3, R8, R7, V3/R2, R4, R9, R7, V4) can be separated from each other, i.e. there is no data transmission link therebetween for determining the switch-on or switch-off instant of power switches (V1, V2).

3. A ballast as set forth in claim 1, characterized in that said control circuits (R1, R3, R8, R7, V3/R2, R4, R9, R7, V4) are directly, without a high-voltage differential connected to the appropriate power switch supplying the lamp current.

4. A ballast as set forth in claim 1, characterized in that each control circuit is provided with means (R1/R2) for sensing a current passing through the appropriate power switch (V1/V2) as well as with means (V3/V4) for controlling the appropriate power switch (V1/V2) in accordance with said current measurement.

5. A ballast as set forth in claim 4, characterized in that each control circuit is provided with means (R1, R3, R8, R7/R2, R4, R9, R7) for sensing a current passing through and a voltage prevailing across the appropriate power switch (V1/V2) as well as with means (V3/V4) for controllably bringing the appropriate power switch (V1/V2) to a conducting state as a certain voltage prevails thereacross and to a non-conducting state as soon as a current passing therethrough reaches a certain value (Ik/Ikl).

6. A ballast as set forth in claim 5, characterized in that in each control circuit, said control means include a semiconductor switch (V3/V4), connected between a power switch control electrode and a lower potential and having its control electrode connected on the one hand to a first point located between power switch (V1/V2) and a resistance (R1/R2) in series therewith and, on the other hand, to a second point by way of a shunt connection formed by a resistance (R8/R9) and a capacitor (C1/C2), said second point being essentially at the same potential as an anode (D) included in the appropriate power switch (V1/V2).

7. A ballast as set forth in claim 1, characterized in that between power switches (V1/V2) there is a point (A) and between this point and a lamp (DL) is a current restricting inductance (Le) provided with means (Lt, V9, V10, Uhehk.) for varying the value of inductance (Le), such that the drive circuit Can be operated at a higher frequency during the switch-on period of a lamp.

8. A ballast as set forth in claim 1, characterized in that said power switches (V1/V2) are MOSFET transistors.

9. A ballast as set forth in claim 5, characterized in that each control circuit is provided with an input for external control voltage (Uohj), such that said current value (Ik/Ilk) can be varied by varying the control voltage.

10. A ballast as set forth in claim 6, characterized in that each control circuit is provided with an input for external control voltage (Uohj), such that said current value (Ik/Ilk) can be varied by varying the control voltage.

* * * * *

UNITED STATES PATENT AND TRADEMARK OFFICE
CERTIFICATE OF CORRECTION

PATENT NO. : 5,410,220
DATED : April 25, 1995
INVENTOR(S) : Kari von Hertzen

It is certified that error appears in the above-indentified patent and that said Letters Patent is hereby corrected as shown below:

Column 4, line 44, change "Can" to --can--.

Signed and Sealed this

Eighth Day of August, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,410,220
DATED : April 25, 1995
INVENTOR(S) : Kari von Hertzen

It is certified that error appears in the above-indentified patent and that said Letters Patent is hereby corrected as shown below:

Column 4, line 53, change "(Ik/Ilk)" to --(Ik/Ikl)--.

Column 4, line 58, change "(Ik/Ilk)" to -- (Ik/Ikl)--.

Signed and Sealed this

Twelfth Day of December, 1995

Attest:

BRUCE LEHMAN

*Attesting Officer*      Commissioner of Patents and Trademarks